United States Patent
Maegawa et al.

(10) Patent No.: US 6,915,203 B2
(45) Date of Patent: Jul. 5, 2005

(54) APPARATUS AND METHOD FOR DIAGNOSIS OF VEHICULAR SYSTEM

(75) Inventors: Yoshinori Maegawa, Obu (JP); Syujiro Morinaga, Takahama (JP); Hisashi Iida, Kariya (JP); Tatsuya Oka, Chiryu (JP); Masakazu Yamada, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/361,866

(22) Filed: Feb. 11, 2003

(65) Prior Publication Data
US 2003/0182050 A1 Sep. 25, 2003

(30) Foreign Application Priority Data

Feb. 12, 2002 (JP) ........................................ 2002-033374

(51) Int. Cl.⁷ ............................................... G06G 7/70
(52) U.S. Cl. ........................... 701/114; 701/92; 701/97; 701/107; 73/117.3; 73/118.1; 60/276; 60/277; 123/359; 123/479; 123/688; 123/690; 123/568.13
(58) Field of Search ........................... 73/118.1, 118.2, 73/117.3; 701/92, 97, 107, 114; 123/339.15, 359, 479, 688, 690, 406.13, 568.16; 60/276, 277

(56) References Cited

U.S. PATENT DOCUMENTS

| | | | | | |
|---|---|---|---|---|---|
| 5,349,936 A | * | 9/1994 | Uchinami | ................... | 123/676 |
| 5,632,257 A | * | 5/1997 | Machida et al. | ............ | 123/435 |
| 6,073,610 A | * | 6/2000 | Matsumoto et al. | ........ | 123/396 |
| 6,085,132 A | * | 7/2000 | Ishii et al. | ..................... | 701/29 |
| 6,283,108 B1 | * | 9/2001 | Matsufuji et al. | ........... | 123/690 |
| 6,354,269 B1 | * | 3/2002 | Saito et al. | ................. | 123/436 |
| 6,371,096 B1 | * | 4/2002 | Ohsaki et al. | .............. | 123/688 |
| 6,470,868 B2 | * | 10/2002 | Nakagawa et al. | ......... | 123/673 |

FOREIGN PATENT DOCUMENTS

| | | |
|---|---|---|
| JP | A-6-74074 | 3/1994 |
| JP | A-9-33478 | 2/1997 |

OTHER PUBLICATIONS

Actron Manufactoring Co. 2000, USA, OBD II Diagnostic Tester.*

* cited by examiner

Primary Examiner—Tony M. Argenbright
Assistant Examiner—Johnny H. Hoang
(74) Attorney, Agent, or Firm—Nixon & Vanderhye P.C.

(57) ABSTRACT

An engine control system has a self-diagnosis function of an exhaust system. The self-diagnosis function includes a first mode for detecting a failure or abnormality of the exhaust system as a whole, and a second mode for determining and locating a specific failed component in the exhaust system. The first mode is executed during the engine is operated under a normal condition. Therefore it is possible to detect the failure of the exhaust system without lowering a drive performance or increasing emissions. In case of detecting any failure in the first mode, the second mode is activated in response to a command signal that can be entered via a service tool. In the second mode, the engine is operated in order to determine the failed component. In the second mode, determining the failed component takes priority over keeping the drive performance or reducing emissions.

29 Claims, 14 Drawing Sheets

APPARATUS AND METHOD FOR DIAGNOSIS OF VEHICULAR SYSTEM

REFERENCE TO RELATED APPLICATIONS

This application is based on Japanese Patent Application No. 2002-33374 filed on Feb. 12, 2002, the contents of which are incorporated herein by reference.

BACKGROUND OF THE INVENTION

1. Field of the Invention

The present invention relates to an apparatus and method for diagnosis of a vehicular system such as an intake system and an exhaust system of an internal combustion engine.

2. Description of Related Art

Conventionally, a motor vehicle has a plurality of system such as an engine intake system, an engine exhaust system, a brake system and a navigation system. Since those systems are becoming complex, it is necessary to equip a self-diagnosis function on those systems in order to prevent an abnormal operation of those systems. However, it is not easy to determine a failed component when the system functions normally, since it is also required to keep normal function of the system. In addition, since each system has a plurality of components of which functions are influenced each other, reliable determination of the failed component is hardly achieved while continuing the normal function of the system.

For example, the exhaust system has a catalyst and a gas sensor. However, a deterioration level and an activation level of the catalyst influence an output of the gas sensor. In order to reduce the influence, JP-A-9-33478 discloses a diagnosis apparatus that sets a threshold value for determining a deterioration of the gas sensor in accordance with the deterioration level and the activation level of the catalyst. However, since the deterioration level of the catalyst also has an error, reliable determination is hardly achieved.

SUMMARY OF THE INVENTION

It is an object of the present invention to provide an apparatus and method for diagnosis of a vehicular system that is capable of determining a failed component in the system without lowering performance of the vehicle when the vehicle is normally operated.

It is an object of the present invention to provide an apparatus and method for diagnosis of a vehicular system that is capable of detecting a failure or abnormality of the system while operating the vehicle normally, and determining a failed component only when the vehicle is in a limited place such as a maintenance shop.

According to a first aspect of the present invention, an apparatus for diagnosis of vehicular system mounted on a vehicle, comprises detecting means for detecting a failure or abnormality of a vehicular system including a plurality of components that may be failed, determining means for determining a failed component from the plurality of components, and diagnosis mode control means for usually activating the detecting means, and activating the determining means only when the vehicle is in a limited place such as a maintenance shop.

It is possible to detect the failure or abnormality of the system when the vehicle is operated in a manner that keeping normal performance of the vehicle. For example, a drive performance and an exhaust gas purifying performance are not lowered. In addition, it is possible to determine and locate a specific failed component when the vehicle is in a limited place such as a maintenance shop.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
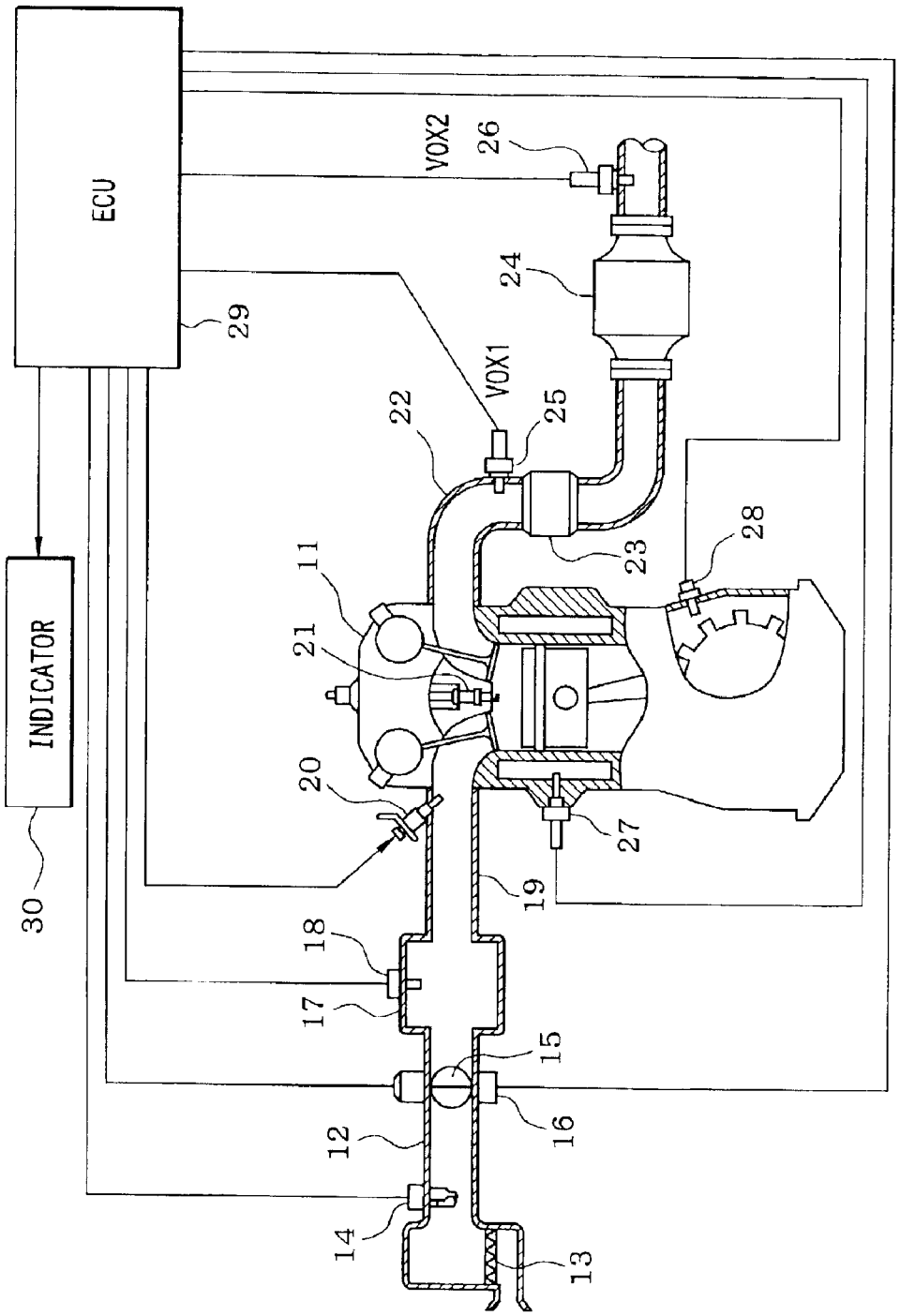
FIG. 1 is a block diagram of an on-vehicle engine control system according to a first embodiment of the present invention.

Referring to FIG. 1, an internal combustion engine (engine) is a spark ignition type four-stroke multi-cylinder engine for a motor vehicle. The engine 11 has an air cleaner 13 for filtering and cleaning an intake air. The air cleaner 13 is connected with an intake passage 12 in which the intake air flows. A throttle valve 15 for adjusting an amount of the intake air is disposed in the intake passage 12. The intake passage 12 has a surge tank 17. The intake passage 12 is connected with an intake manifold 19. The intake manifold 19 provides a plurality of branch passages leading to cylinders of the engine respectively. Each of the branch passage has an injector 20 for injecting fuel and mixing the injected fuel with the intake air to provide mixture. Each of the cylinders has a spark plug 21. The spark plug 21 is coupled with an igniter device that supplies high-tension voltage to the spark plug 21 in response to an ignition signal from an engine control unit.

The engine 11 has an exhaust passage 22. Two catalysts 23, 24 are disposed in the exhaust passage 22 in a series manner. The catalyst 23 is disposed in the exhaust passage 22 upstream the catalyst 24. The catalyst 24 is disposed in the exhaust passage 22 downstream the catalyst 23. The catalysts 23, 24 are three-way type. The catalysts 23, 24 purify the exhaust gas and decrease emissions by decreasing emission components such as CO, HC and NOx. The catalyst 23 and 24 are distanced each other. The catalyst 23 may have a plurality of catalysts.

An airflow meter 141 is disposed in the intake passage 12 just downstream the air cleaner 13. The airflow meter 14 detects an intake air amount AM that is an intake air amount per unit time. A throttle sensor 16 is disposed on the throttle valve 15, and outputs a signal indicative of an opening degree TH of the throttle valve 15. An intake pressure sensor 18 is disposed on the surge tank 17 and outputs a signal indicative of an intake pressure PM. A water temperature sensor 27 is disposed on a cylinder block of the engine 11 and outputs a signal indicative of a water temperature TW of cooling water. A crank angle sensor 28 is disposed on the engine 11 and outputs a signal indicative of an engine speed NE of rotation of the engine.

A first gas sensor 25 is disposed on the exhaust passage 22 just upstream the catalyst 23. The first gas sensor 25 is an air-fuel ratio sensor, i.e., an A/F sensor. The first gas sensor 25 outputs a signal VOX1 indicative of an air-fuel ratio based on the contents of the exhaust gas in the exhaust passage 22 just upstream the catalyst 23. A second gas sensor 26 is disposed on the exhaust passage 22 downstream the catalyst 24. The second gas sensor 26 is an oxygen concentration sensor, i.e., an O2 sensor. The second gas sensor 26 outputs a signal VOX2 indicative of a rich condition (fuel rich condition) or a lean condition (fuel lean condition) of the exhaust gas in the exhaust passage 22 downstream the catalyst 24. The first and second gas sensors may be either the A/F sensor or the O2 sensor.

An engine control unit (ECU) 29 is mounted on the vehicle. The ECU 29 is constructed as a microcomputer having well known components such as CPU, ROM, RAM, Back-up RAM, and I/O. The ECU 29 is connected with the sensors to input an engine operating conditions such as the intake air amount AM, the throttle opening degree TH, the intake pressure PM, the water temperature TW, the engine speed NE, and the signals VOX1, VOX2. The ECU 29 is connected with actuators such as the injectors 20 to control the engine operating conditions. The ECU 29 outputs control signals such as an injection amount signal TAU for the injectors 20, an ignition timing signal Ig for the igniter, and a throttle control signal TG for the throttle valve 15. The ECU 29 further connected with an indicator 30 that is disposed on an instrument panel for displaying a warning signal.

The ECU 29 executes an air-fuel ratio control. The ECU 29 provides a main feedback loop and a sub feedback loop. The main feedback loop controls at least the injectors 20 to adjust the fuel amount based on the signal VOX1 and a target air-fuel ratio at a location upstream the catalyst 23. The main feedback loop controls the fuel amount so that the signal VOX1 indicates the target air-fuel ratio. The sub feedback loop controls and correct the target air-fuel ratio in the main feedback loop in accordance with the signal VOX2.

The ECU 29 further includes a self-diagnosis function for diagnosis of the exhaust system of the engine 11. The self-diagnosis function is provided by two modes, a first mode for detecting a failure in the exhaust system, and a second mode for determining and locating a failed component in the exhaust system.

In the first mode, the ECU 29 executes a diagnosis of the exhaust system as a whole. The ECU 29 activates the indicator 30 to warn the driver of the vehicle if a failure or abnormality is detected in the first mode. The ECU 29 usually executes the first mode during the engine 11 works as a motor for the vehicle in a usual manner. Therefore, during the first mode, the ECU 29 operates the vehicle under a predetermined condition in which the vehicle shows the best performance. For example, the ECU 29 controls the engine 11 in order to output a demanded power and to reduce emissions. The user of the vehicle will receive a warning when the failure or abnormality is detected.

Then, if a specific command signal is entered, the ECU 29 enters the second mode. In the second mode, the ECU 29 is enabled to control the engine 11 for determining and locating the component that is failed or abnormal. In the second mode, the ECU 29 controls the engine 11 so that determining the failed component takes priority over outputting the demanded power and reducing the emissions. Therefore, during the second mode, the ECU 29 operates the vehicle under a condition in which the performance of the vehicle is lowered in a certain amount. For example, the ECU 29 may control the engine 11 regardless of a demanded power. The ECU 29 may control the engine 11 to a condition in which emissions may be increased. In the second mode, the ECU 29 determines the failed component form the component such as the catalysts 23, 24 and the gas sensors 25, 26.

The second mode is only permitted for a maintenance shop or an emergency. For example, the command signal for activating the second mode can be entered via an off-board device such as a service tool in a maintenance shop. The command signal may be entered via an on-board device such as a secret switch on the vehicle or a unique operation of other switches. As a result, the second mode can be activated only when the vehicle is in a limited place such as a maintenance shop.

Figure 2:
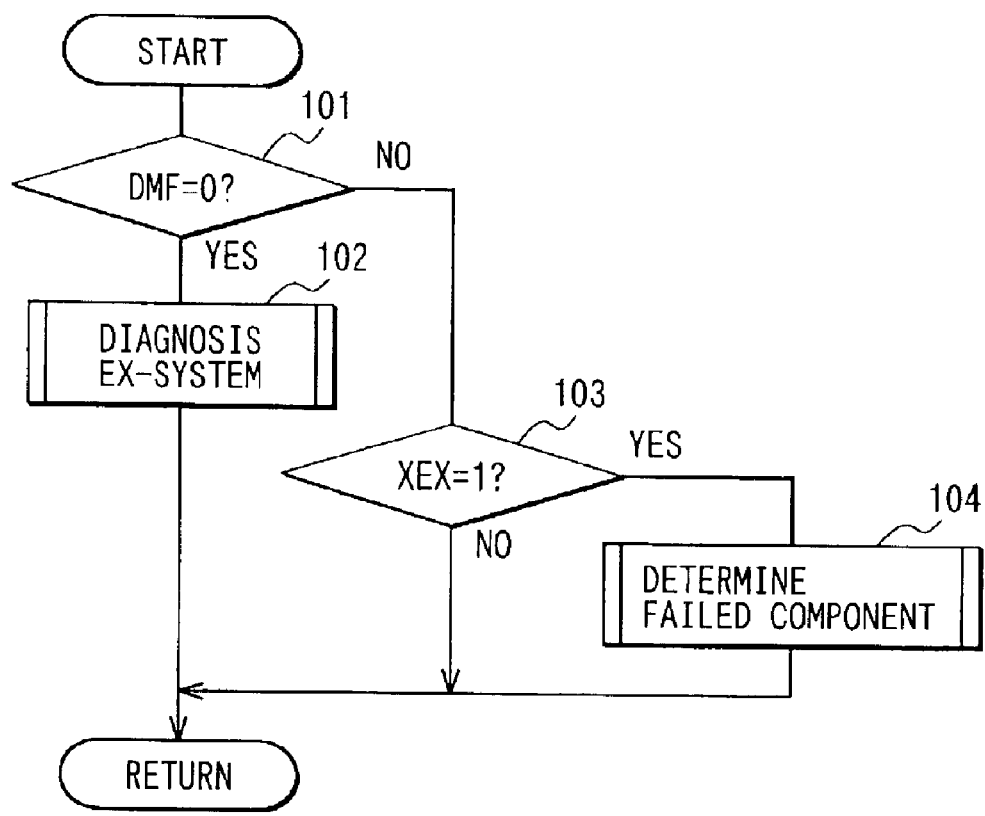
FIG. 2 is a flowchart showing a diagnosis program for an exhaust system according to the first embodiment of the present invention.

Referring to FIG. 2, the routine shown in FIG. 2 is executed every predetermined interval.

In step 101, it is determined that whether or not it is the first mode by evaluating a flag DMF. The flag DMF is usually set 0, and is set 1 only when the command signal is entered via the service tool in the maintenance shop. The flag DMF is memorized in the back-up RAM.

Figure 3:
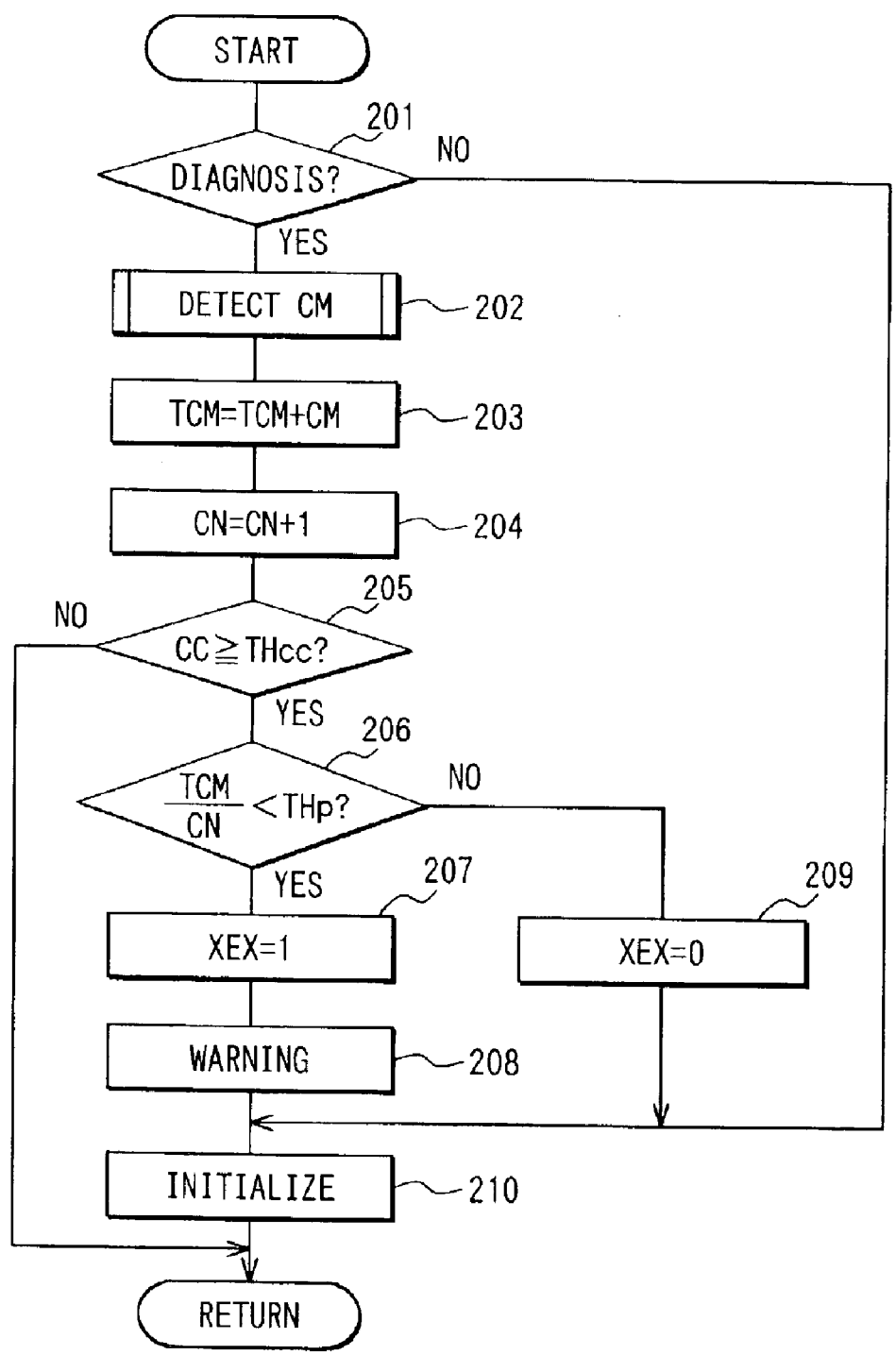
FIG. 3 is a flowchart showing a part of the diagnosis program in FIG. 2 in detail.

If the routine branches to step 102, the ECU 29 executes a processing for the first mode as shown in FIG. 3. If the routine branches to step 103, it is determined that whether or not the failure has been detected in the first mode as shown in FIG. 3 by evaluating a flag XEX. The flag XEX is also memorized in the back-up RAM.

If the flag XEX is 1, in step 104, the ECU 29 executes the second mode, that is a failed component determining processing as shown in FIGS. 4–7. Alternatively, the step 103 may be eliminated, and the ECU 29 executes step 104 in response to the command signal only. The processing in step 101 works as a mode changing means.

When the ECU 29 executes step 102, the ECU 29 simultaneously executes the air-fuel ratio feedback control of the engine 11. The ECU 29 controls the air-fuel ratio of mixture supplied to the engine 11 so as to satisfy the demanded output power and to reduce emissions. For example, the air-fuel ratio is controlled so that a storage amount of rich components and lean components in the catalysts 23, 24 is maintained within a target range, e.g., below a saturated storage amount, in order to keep efficiency of the catalysts 23, 24. The catalysts 23, 24 are maintained in a stoichiometric condition. Therefore, the first mode for diagnosis the system as a whole is executed under a normal and regular operating condition of the engine 11. In the first mode, the ECU 29 monitors a phase difference between the signals VOX1 and VOX2, and determines the failure or abnormality of the exhaust system based on the average value of the phase difference.

In step 201, it is determined that whether or not the diagnosis is permitted. The diagnosis may be permitted when all of predetermined conditions are satisfied. For example, the diagnosis is permitted when the catalysts 23,24 and the gas sensors 25, 26 are activated, the engine 11 is operated under a stable condition, and the air-fuel ratio feedback control is normally executed.

In step 202, the phase difference CM between the signals VOX1 and VOX2 is detected. In this embodiment, the phase difference CM is a delay time between responses of the signals VOX1 and VOX2. For example, the phase difference CM can be measured by monitoring the response of the signals VOX1 and VOX2 after the air-fuel ratio is changed by a predetermined amount. The phase difference CM may be represented by a period of time or a crank angle from a timing on which the signal VOX1 is changed from a rich value to a lean value to a timing on which the signal VOX2 is changed from a rich value to a lean value. The phase difference CM is detected in response to an event on which the air-fuel ratio is changed by a predetermined amount that is small enough in order to maintain the normal drive performance and keep emissions low. Therefore, the phase difference CM can be measured without lowering the drive performance of the vehicle and increasing emissions.

In step 203, detected values of the phase difference CM is accumulated. In step 204, a counter CN is incremented to measure a time period of the accumulation in step 203.

In step 205, it is determined that whether or not a timer CC reaches a threshold value THCC. The timer CC measures a time period for detecting the phase difference CM. If the timer CC is not larger than the threshold value THCC, the routine jumps the following steps. Therefore, the routine repeats steps 201–204 until a predetermined time is elapsed. The timer CC may be replaced with the counter CN. If the timer CC is equal to or larger than the threshold value THCC, the routine proceeds to step 206.

In step 206, it is determined that whether or not an average value TCM/CN is smaller than a threshold value THp. The threshold value THp is a value for determining whether there is a failure or not. If the average value TCM/CN is smaller than the threshold value THp, the ECU 29 sets the flag XEX, and stores the flag XEX in step 207. In addition, the ECU 29 activates the indicator 30 to display a warning signal to the driver. If the average value TCM/CN is not smaller than the threshold value THp, the ECU 29 resets the flag XEX, and stores it in step 209.

In step 210, the ECU 29 initializes the variables such as the accumulated value TCM, and the counter CN, and repeats the processing.

Figure 4:
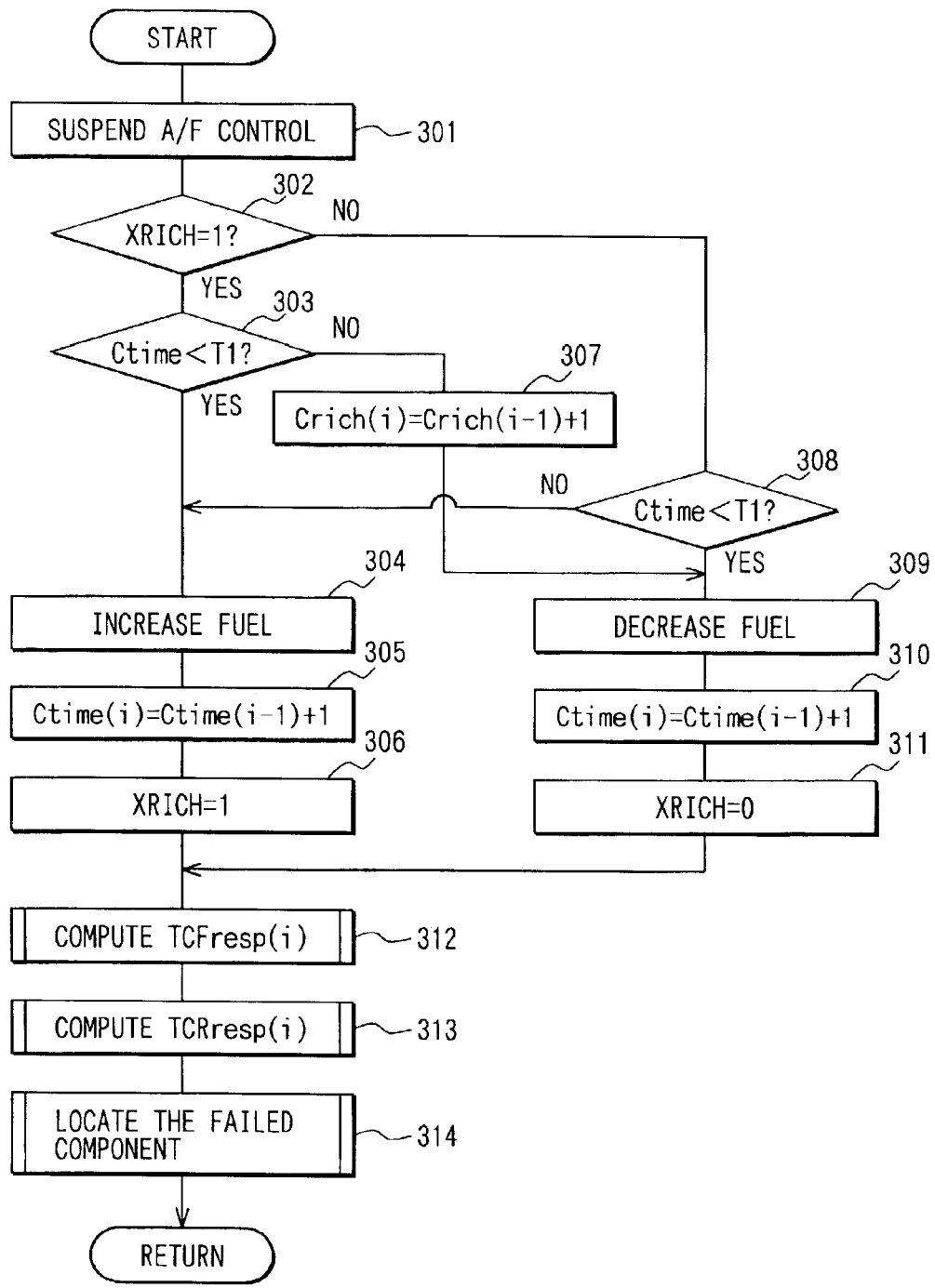
FIG. 4 is a flowchart showing a part of the diagnosis program in FIG. 2 in detail.

Referring to FIG. 4, in step 104, the ECU 29 executes the routine shown in FIG. 4. In this routine, the ECU 29 suspends the air-fuel ratio feedback control, and executes a fixed cyclic control of the air-fuel ratio. In the fixed cyclic control, the ECU 29 alternately repeats a rich control and a lean control at a fixed cycle. In the rich control, the air-fuel ratio is controlled in a rich value, compared with the stoichiometric value, that is sufficient to make the catalysts 23, 24 saturated with the rich components quickly. In the lean control, the air-fuel ratio is controlled in a lean value, compared with the stoichiometric value, that is sufficient to make the catalysts 23, 24 saturated with the lean components quickly. By executing the fixed cyclic control, it is possible to eliminate or reduce an influence of deterioration of the catalysts 23, 24 from a response of the gas sensor 26 disposed downstream. Therefore, it is possible to detect the delay time between the signals VOX1 and VOX2 without the influence of the capacity of the catalysts 23, 24.

In step 301, the ECU 29 suspends the air-fuel ratio feedback control, and executes the fixed cyclic control.

In step 302, it is determined whether or not the rich control is executed on the basis of a flag XRICH. If the rich control is executed, it is determined that whether or not a timer Ctime is smaller than a fixed cycle T1 in step 303. If the timer Ctime is smaller than the fixed cycle T1, the ECU 29 continues the rich control in steps 304–306. If the timer Ctime is not smaller than the fixed cycle T1, the ECU 29 increments a counter Crich(i) in step 307, and changes the control from the rich control to the lean control.

On the other hand, if the routine branches from step 302 to step 308, it is determined that whether or not the timer Ctime is smaller than the fixed cycle T1. If the timer Ctime is smaller than the fixed cycle T1, the ECU 29 continues the lean control in steps 309–311. If the timer Ctime is not smaller than the fixed cycle T1, the ECU 29 changes the control from the lean control to the rich control.

In step 304, an amount of fuel supplied from the injector 20 is increased. An increased amount of fuel is set larger than that in the first mode in step 202. In step 305, the timer Ctime is incremented. In step 306, the flag XRICH is set to indicate the rich control has been executed.

In step 309, an amount of fuel supplied from the injector 20 is decreased. A decreased amount of fuel is set larger than that in the first mode in step 202. In step 310, the timer Ctime is incremented. In step 311, the flag XRICH is reset to indicate the lean control has been executed.

As a result, the rich control and the lean control are periodically executed with the cycle T1.

Figure 5:
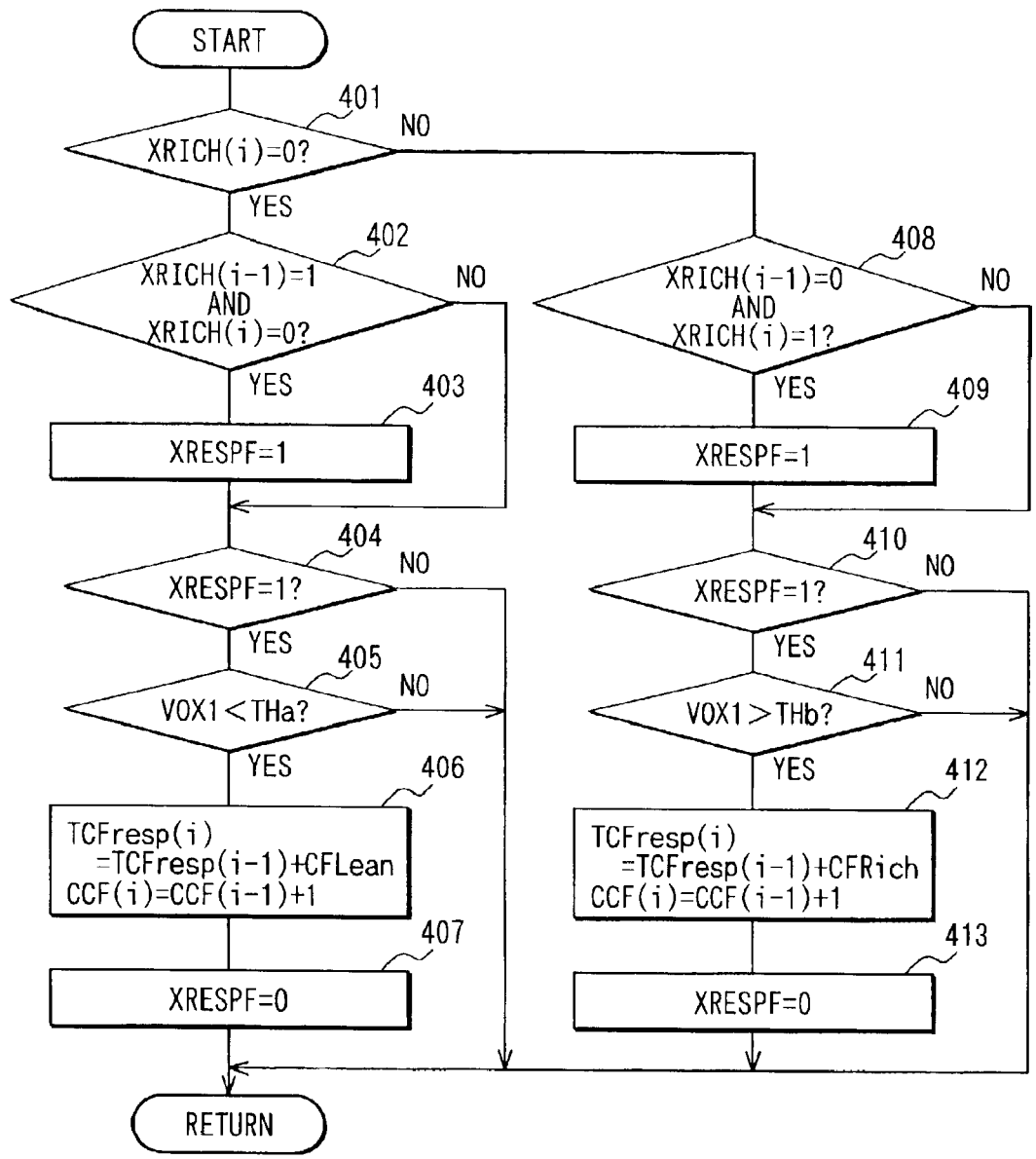
FIG. 5 is a flowchart showing a part of the diagnosis program in FIG. 4 in detail.
Figure 6:
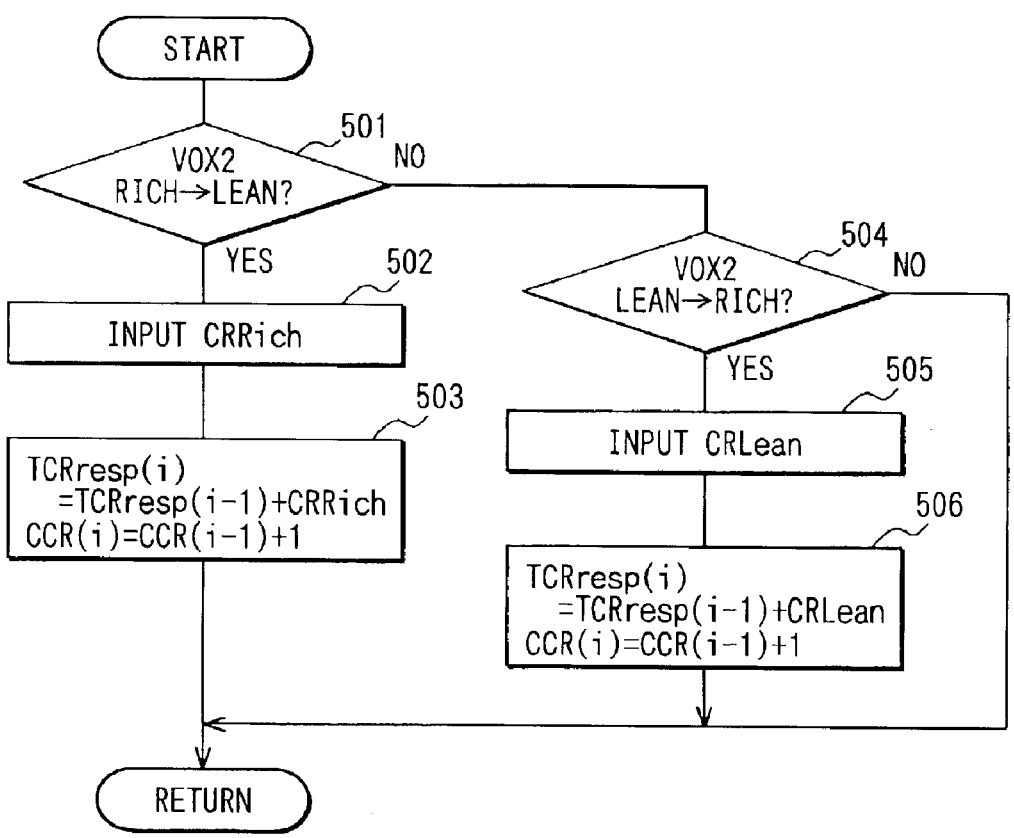
FIG. 6 is a flowchart showing a part of the diagnosis program in FIG. 4 in detail.

In step 312, the ECU 29 computes an accumulated response time TCFresp(i) of the gas sensor 25 by executing the routine as shown in FIG. 5. In step 313, the ECU 29 computes an accumulated response time TCRresp(i) of the gas sensor 26 by executing the routine as shown in FIG. 6. Then, in step 314, the ECU 29 computes an average response time Ftime of the gas sensor 25 and an average response time Rtime of the gas sensor 26, and determines and locates the failed component in the exhaust system.

FIG. 5 shows a routine for computing the accumulated response time TCFresp and for counting a counter CCF indicative of number of accumulated samples. The ECU 29 monitors the signal VOX1 to measure a lean response time CFLean and a rich response time CFRich. The lean response time CFLean is a period of time from a timing on which the rich control is finished and the lean control is commenced to a timing on which the signal VOX1 indicates the change from the rich control to the lean control. The rich response time CFRich is a period of time from a timing on which the lean control is finished and the rich control is commenced to a timing on which the signal VOX1 indicates the change from the lean control to the rich control. The ECU 29 computes the accumulated response time TCFresp by accumulating the rich response time CFRich and the lean response time CFLean. The ECU 29 also counts the counter CCF.

In step 401, it is determined whether or not the lean control is executed on the basis of the flag XRICH. If the lean control is executed, in step 402, the ECU 29 determines that whether or not the control has been just changed from the rich control to the lean control on the basis of the present value XRICH(i) and the last value XRICH(i−1) of the flag. If the control has been changed just before, in step 403, a flag XRESPF is set to indicate the response time has been measured.

In step 404, it is determined whether or not the response time has been measured on the basis of the flag XRESPF. In step 405, it is determined that whether or not the signal VOX1 is smaller than a threshold value THa. The threshold value THa indicates that the gas sensor 25 detects a lean condition derived from the change of the control from the rich control to the lean control. In case that the gas sensor 25 is the O2 sensor, the threshold value THa is set slightly larger than 0 (V) that is a minimum output. Therefore, if the gas sensor 25 detects the change of the control, the routine proceeds to step 406.

In step 406, the ECU 29 converts the timer Ctime into the lean response time CFLean, and accumulates the lean response time CFLean in the accumulated response time TCFresp. Simultaneously, the counter CCF is incremented. In step 407, the flag XRESPF is reset.

If the lean control is not executed in step 401, the routine proceeds to step 408. In step 408, the ECU 29 determines that whether or not the control has been just changed from the lean control to the rich control on the basis of the present value XRICH(i) and the last value XRICH(i−1) of the flag. If the control has been changed just before, in step 409, the flag XRESPF is set to indicate the response time has been measured.

In step 410, it is determined whether or not the response time has been measured on the basis of the flag XRESPF. In step 411, it is determined that whether or not the signal VOX1 is greater than a threshold value THb. The threshold value THb indicates that the gas sensor 25 detects a rich condition derived from the change of the control from the lean control to the rich control. In case that the gas sensor 25 is the O2 sensor, the threshold value THb is set slightly smaller than 1.0 (V) that is a maximum output. Therefore, if the gas sensor 25 detects the change of the control, the routine proceeds to step 412.

In step 412, the ECU 29 converts the timer Ctime into the rich response time CFRich, and accumulates the rich response time CFRich in the accumulated response time TCFresp. Simultaneously, the counter CCF is incremented. In step 413, the flag XRESPF is reset.

FIG. 6 shows a routine for computing the accumulated response time TCRresp and for counting a counter CCR indicative of number of accumulated samples. The ECU 29 monitors the signal VOX2 to measure a lean cycle time CRLean and a rich cycle time CRRich. The lean cycle time CRLean is a period of time during the signal VOX2 indicates a lean value. The rich cycle time CRRich is a period of time during the signal VOX2 indicates a rich value. The ECU 29 computes the accumulated response time TCRresp by accumulating the lean cycle time CRLean and the rich cycle time CRRich. The ECU 29 also counts the counter CCR.

In step 501, the ECU 29 determines that whether or not the signal VOX2 has been changed from a rich value to a lean value. For instance, it is determined that whether or not the signal VOX2 crosses and higher than a threshold value for determining a rich/lean turn over. The threshold value is set at a signal level of the signal VOX2 when the signal VOX2 indicates the stoichiometric air-fuel ratio. In case of that the gas sensor 26 is the O2 sensor, the threshold value is set about 0.5 (V).

If the signal VOX2 turns from the rich value to the lean value, in step 502, the ECU 29 inputs the rich cycle time CRRich. A timer may obtain the rich cycle time CRRich. Then, in step 503, the ECU 29 accumulates the rich cycle time CRRich in the accumulated response time TCRresp, and increments the counter CCR.

In step 504, the ECU 29 determines that whether or not the signal VOX2 has been changed from the lean value to the rich value. For instance, it is determined that whether or not the signal VOX2 reaches to and below the threshold value.

If the signal VOX2 turns from the lean value to the rich value, in step 505, the ECU 29 inputs the lean cycle time CRLean. A timer may obtain the lean cycle time CRLean. Then, in step 506, the ECU 29 accumulates the lean cycle time CRLean in the accumulated response time TCRresp, and increments the counter CCR.

Figure 7:
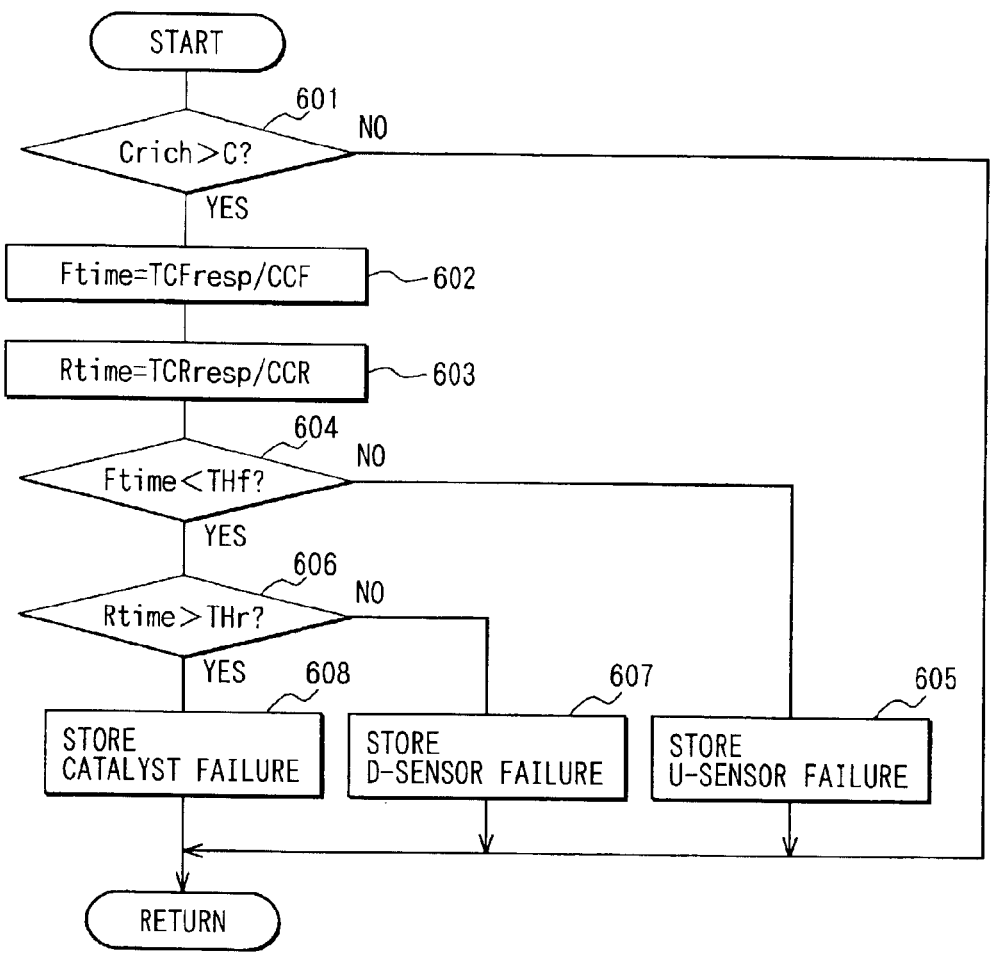
FIG. 7 is a flowchart showing a part of the diagnosis program in FIG. 4 in detail.

FIG. 7 shows a routine for determining and locating the failed component in the exhaust system. In this routine, the ECU 29 computes the average response time Ftime of the gas sensor 25 and the average response time Rtime of the gas sensor 26, and determines the failed component in the exhaust system.

In step 601, the ECU 29 determines that whether or not the counter Crich is greater than a threshold value C. The threshold value C determines a minimum number of executing the rich control, i.e., a minimum number of cycles of the fixed cyclic control for determining the failed component. If the counter Crich reaches to the threshold value C, the routine proceeds to step 602.

In step 602, the ECU 29 computes the average response Ftime by an expression Ftime=TCFresp/CCF. In step 603, the ECU 29 computes the average response Rtime by an expression Rtime=TCRresp/CCR.

In step 604, the ECU 29 determines that whether or not the average response time Ftime is shorter than a threshold value THf. If the average response time Ftime is not shorter than the threshold value THf, it is assumed that the gas sensor 25 disposed upstream is failed or abnormal. The ECU 29 stores the upstream gas sensor failure in step 605.

In step 605, the ECU 29 determines that whether or not the average response time Rtime is longer than a threshold value THr. If the average response time Rtime is not longer than the threshold value THr, it is assumed that the gas sensor 26 disposed downstream is failed or abnormal. The ECU 29 stores the downstream gas sensor failure in step 606.

In step 608, in this case, it is assumed that the failure detected in step 102 is derived from a failure or a deterioration of the catalysts 23, 24, and the ECU 29 stores the catalyst failure. Then, the ECU 29 transmits data indicative of the failed component stored in steps 605, 607 and 608 to the service tool to display the failed component to a mechanic.

The routine shown in FIG. 7 may be modified so that step 606 is executed after step 605. As a result, it is possible to determine the failure of both gas sensors. In addition, although all processing are executed in an on-board device in the first embodiment, a part of the processing in step 104 may be executed in an off-board device such as the service tool that is connected with the ECU 29 at the maintenance shop. For example, the processing shown in FIG. 7 may be executed on the service tool.

Figure 8:
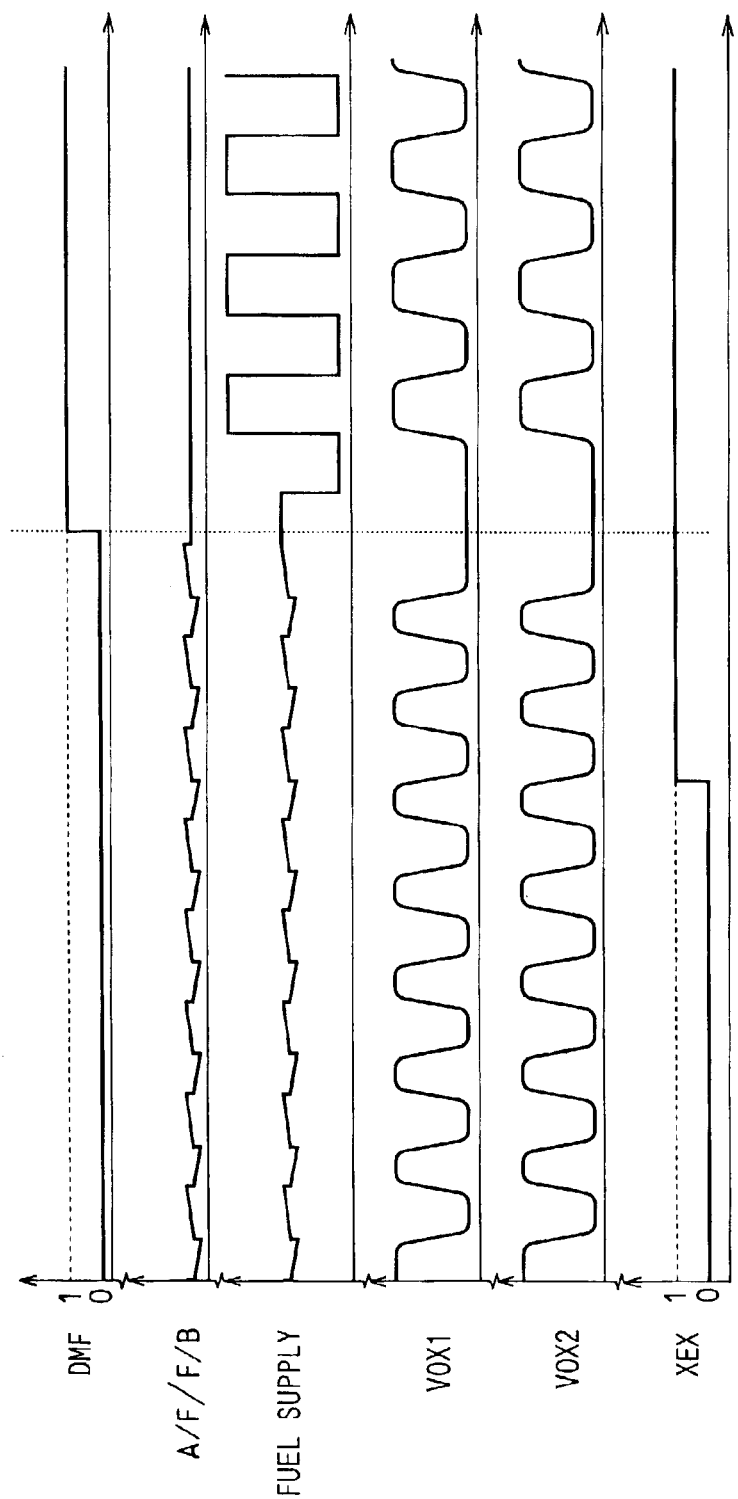
FIG. 8 is a timing diagram showing waveforms relating to the diagnosis program according to the first embodiment of the present invention.
Figure 9:
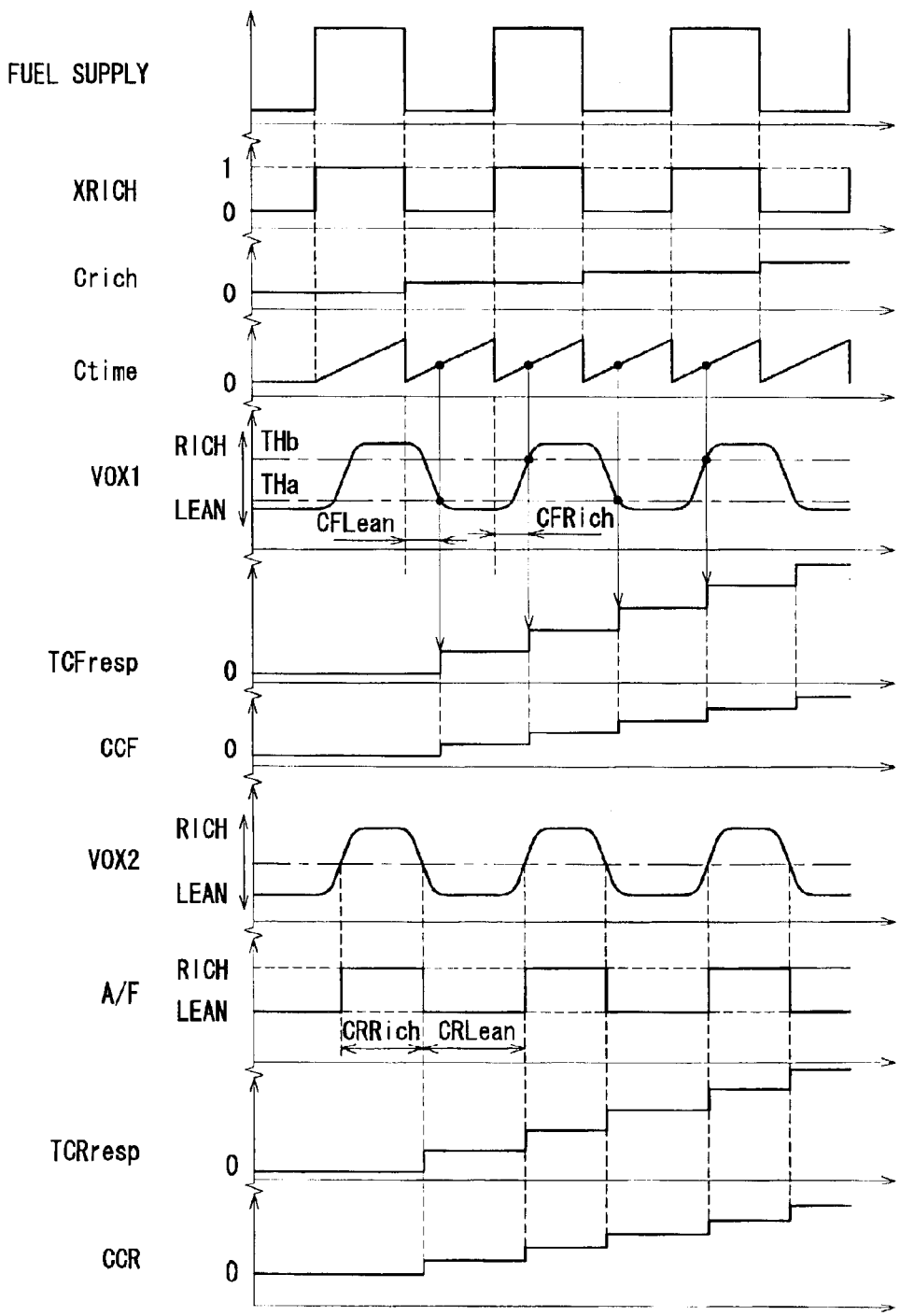
FIG. 9 is a timing diagram showing waveforms relating to measuring of gas sensor response times according to the first embodiment of the present invention.

FIG. 8 is a timing diagram showing waveforms under the first mode and the second mode. In the first mode, as shown in a left part of FIG. 8, an air-fuel ratio feedback control amount A/F F/B is obtained by the air-fuel ratio feedback control. When, a failure or abnormality of the exhaust system is detected during the first mode, the ECU 29 sets the flag XEX and permits the second mode. Then, if the vehicle is brought into a maintenance shop, a mechanic sets the flag DFM and activates the second mode. In the second mode, as shown in a right part of FIG. 8, the ECU 29 prohibits the air-fuel ratio feedback control, and executes the fixed cyclic control in order to locate the failed component. FIG. 9 shows waveforms in the second mode.

According to the first embodiment, it is possible to detect the failure or abnormality of the exhaust system while operating the engine 11 under an operating condition that enables a preferable drive performance and emissions. It is possible to warn the driver that the exhaust system has a failure or abnormality. In addition, it is possible to determine and locate the failed or abnormal component in the exhaust system by switching the diagnosis function of the ECU 29 from the first mode to the second mode. In case of operating the engine 11 to determine the failed component, the engine 11 may be operated under an operating condition that may lower the drive performance or increase emissions. However, the first embodiment can limit the event of the diagnosis of determining the failed component. For example, the second mode is only permitted for a maintenance shop. Therefore, it is possible to keep the drive performance and emissions during normal driving of the vehicle. In addition, the second mode is only permitted when the failure or abnormality is detected in the first mode. Therefore, it is possible to limit entering the second mode.

In addition, in the second mode, since the ECU 29 locates the failed component, it is possible to eliminate diagnosis work for locating the failed component and shorten work time of a mechanic. Conventionally, the mechanic has to work on a trial and error method to locate the failed component by replacing a suspicious component with a component that works properly. However, according to the present invention, it is possible to locate the failed component easily at the maintenance shop.

Second Embodiment

FIGS. 10–14 show a second embodiment that is applied to the same system as shown in FIG. 1. In the second embodiment, a failure or abnormality of the intake system is detected by a self-diagnosis function. The ECU 29 executes a throttle control. The ECU 29 controls the throttle valve 15 in order to generate a demanded output power and keep emissions low.

The ECU 29 further includes a self-diagnosis function for diagnosis of the intake system of the engine 11. The self-diagnosis function is provided by two modes, a first mode for detecting a failure in the intake system, and a second mode for determining and locating a failed component in the intake system.

In the first mode, the ECU 29 executes a diagnosis of the intake system as a whole. The ECU 29 activates the indicator 30 to warn the driver of the vehicle if a failure or abnormality is detected in the first mode. The ECU 29 usually executes the first mode during the engine 11 works as a motor for the vehicle. Therefore, during the first mode, the ECU 29 controls the engine 11 to generate a demanded output power and to keep emissions low. The user of the vehicle will receive a warning when the failure or abnormality is detected.

Then, if a specific command signal is entered, the ECU 29 enters the second mode. In the second mode, the ECU 29 is enabled to control the engine 11 for determining and locating the component that is failed or abnormal. Therefore, in the second mode, the ECU 29 controls the engine 11 so that determining the failed component takes priority over outputting the demanded power and reducing emissions. In the second mode, the ECU 29 determines the failed component form the component such as the airflow meter 14, the throttle sensor 16 and the intake pressure sensor 18.

The second mode is only permitted for a maintenance shop. For example, the command signal for activating the second mode may be entered via an off-board device such as a service tool in the maintenance shop. The command signal may be entered via an on-board device such as a secret switch on the vehicle or a unique operation of other switches.

Figure 10:
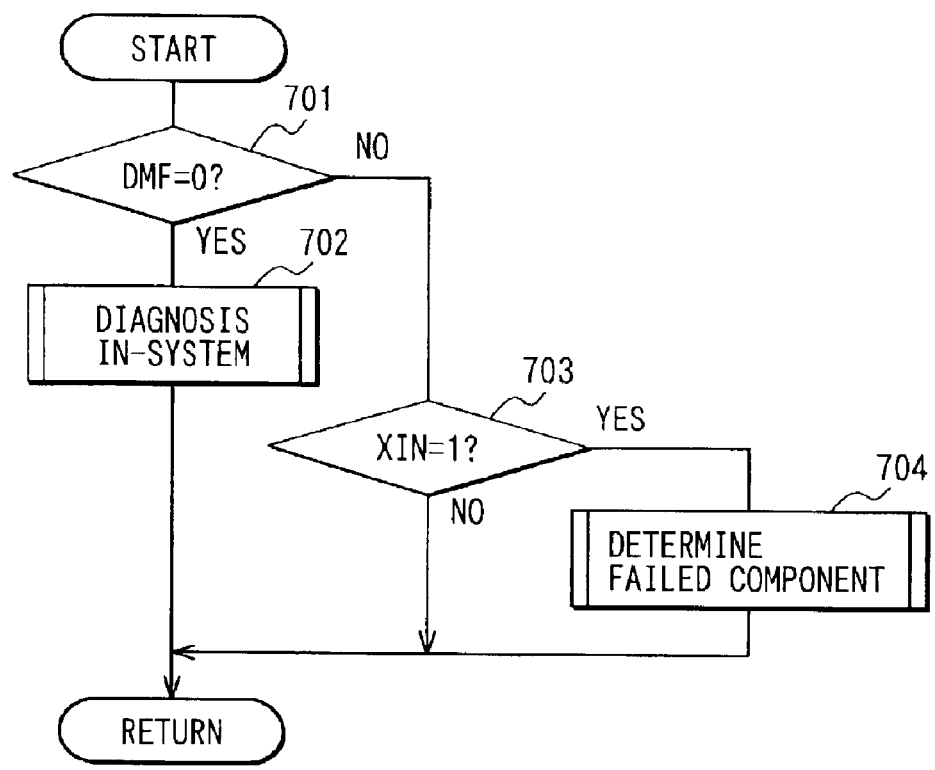
FIG. 10 is a flowchart showing a diagnosis program for an intake system according to a second embodiment of the present invention.
Figure 11:
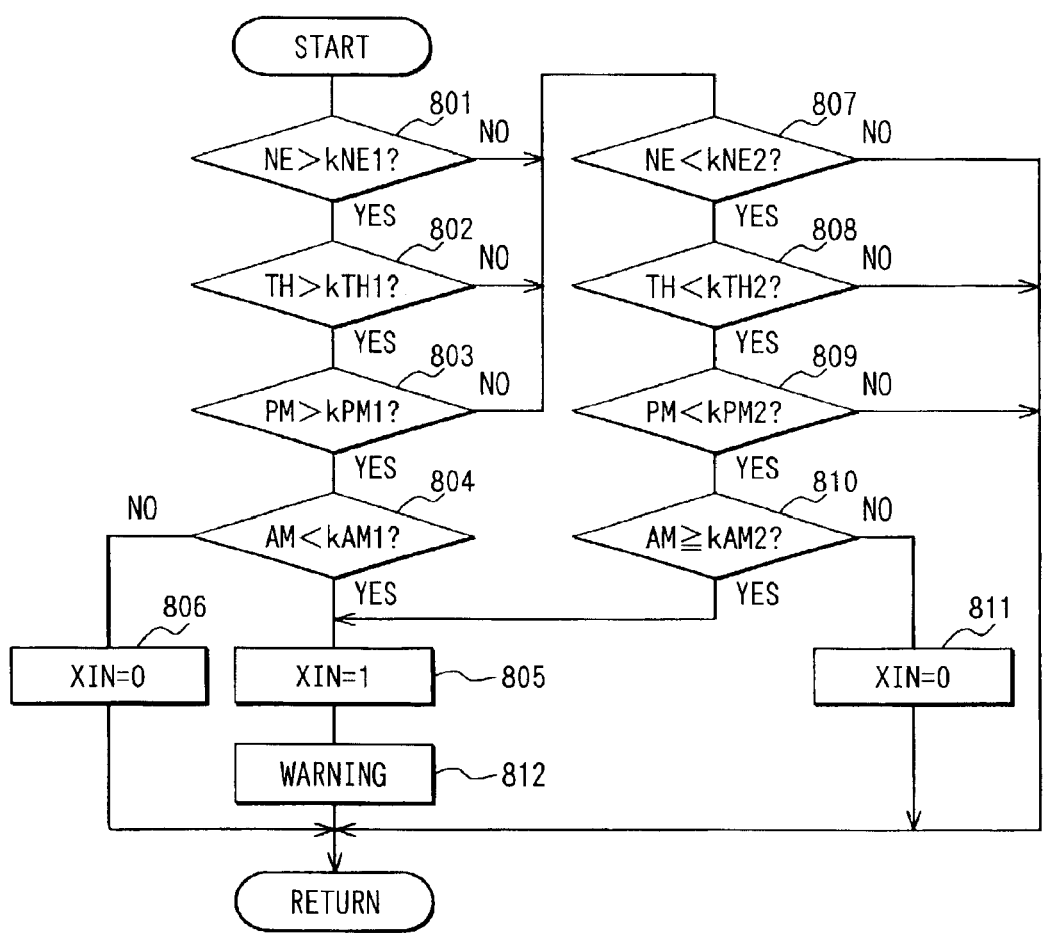
FIG. 11 is a flowchart showing a part of the diagnosis program in FIG. 10 in detail.
Figure 12:
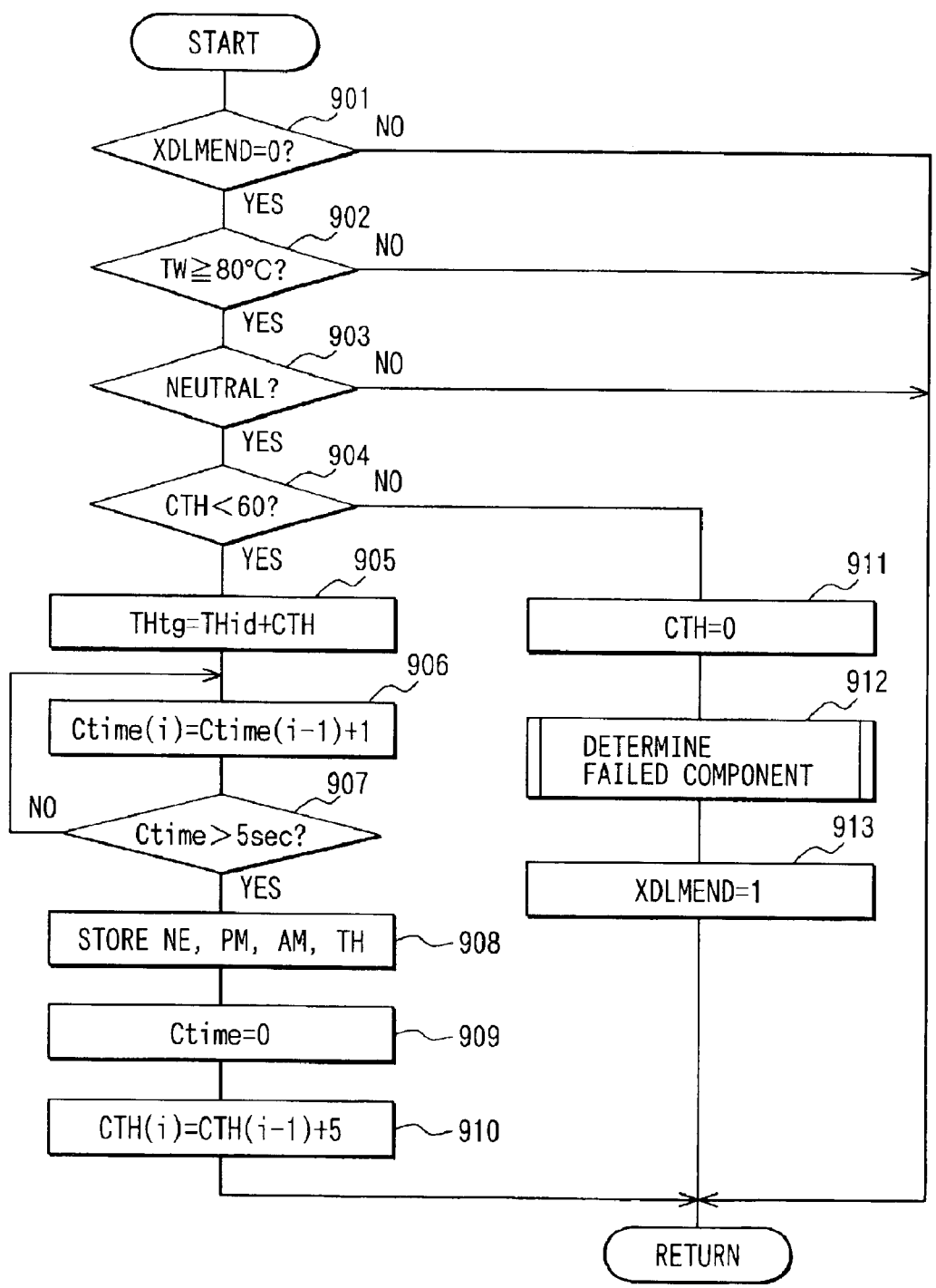
FIG. 12 is a flowchart showing a part of the diagnosis program in FIG. 11 in detail.
Figure 13:
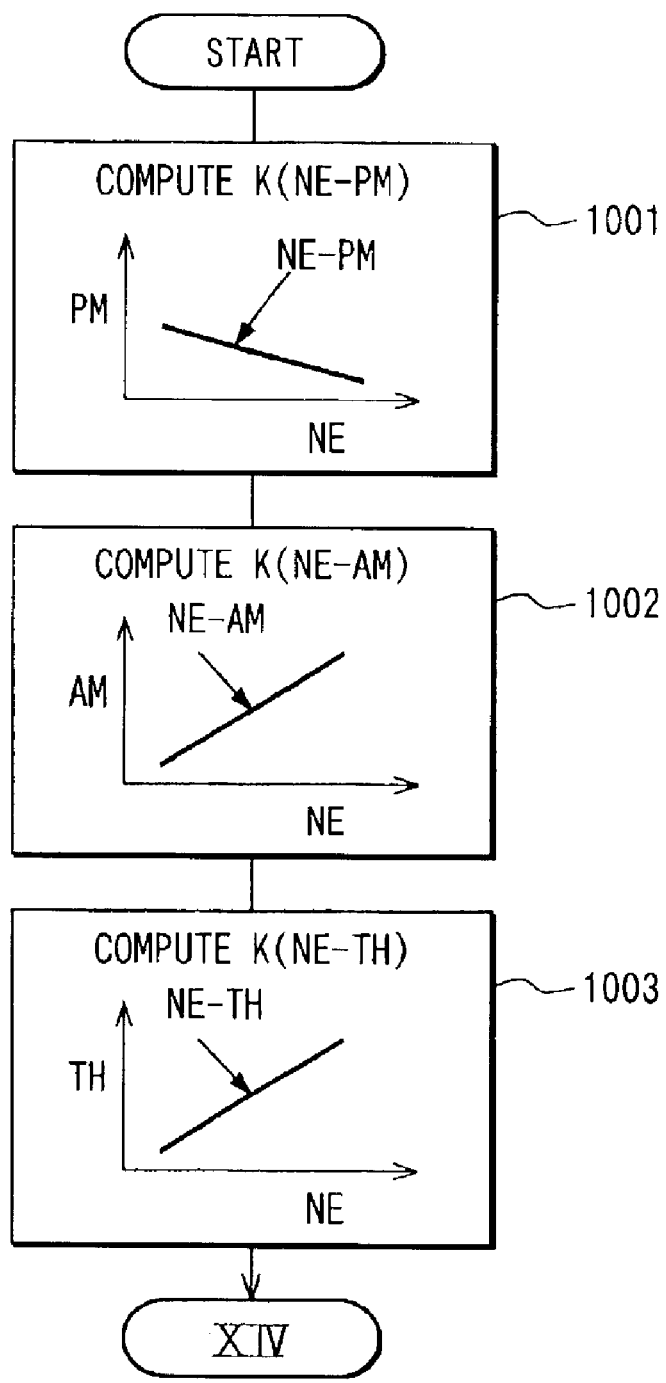
FIG. 13 is a flowchart showing a part of the diagnosis program in FIG. 12 in detail.
Figure 14:
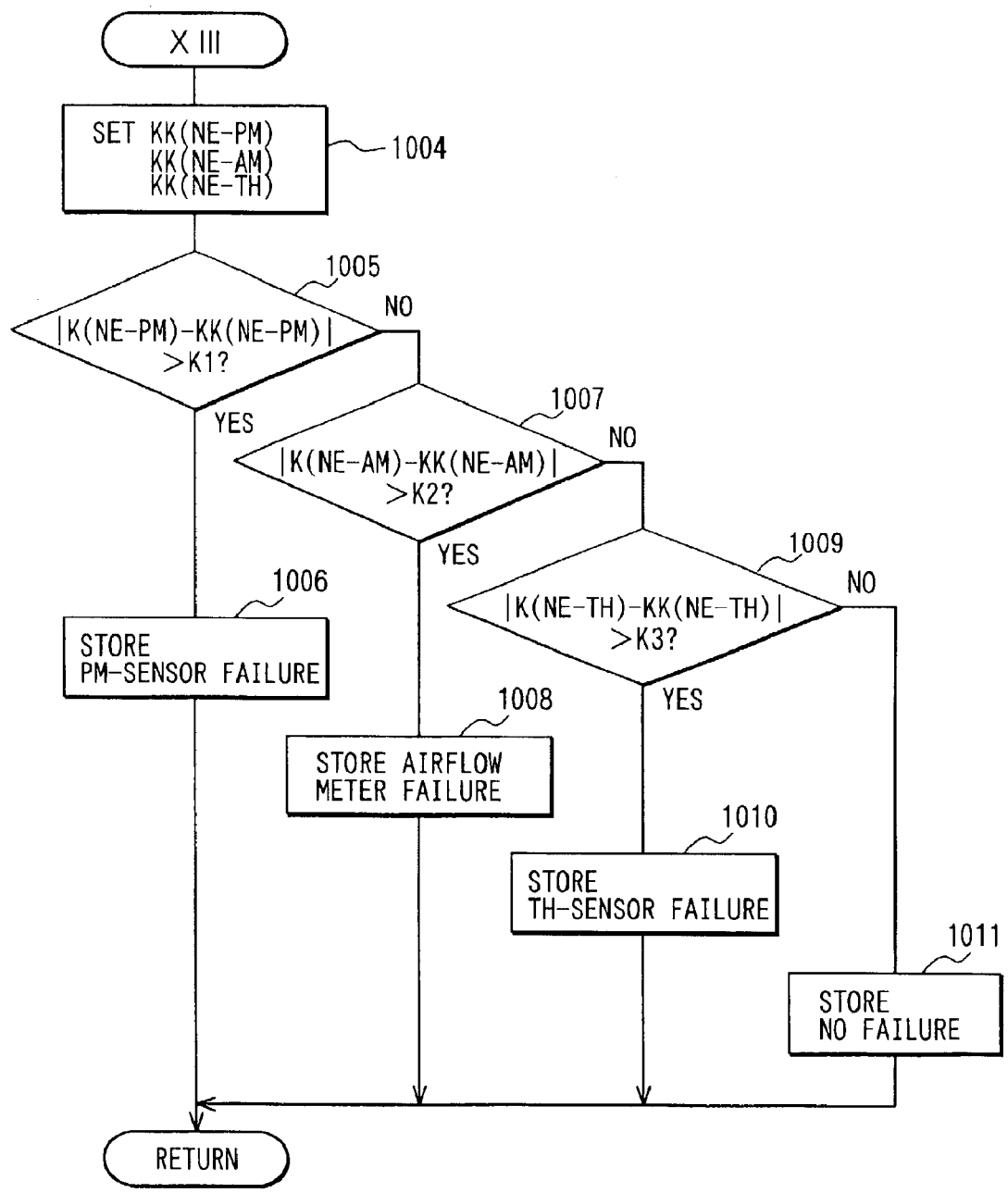
FIG. 14 is a flowchart showing a part of the diagnosis program in FIG. 12 in detail, and is to be connected with FIG. 13 via a symbol XIII and a symbol XIV.

Referring to FIG. 10, the routine shown in FIG. 10 is executed every predetermined interval. In step 701, it is determined that whether or not it is the normal diagnosis mode by evaluating a flag DMF. The flag DMF is usually set 0, and is set 1 only when the command signal is entered via the service tool in the maintenance shop. The flag DMF is memorized in the back-up RAM. In step 702, the ECU 29 executes a normal diagnosis processing as shown in FIG. 11 that is the first mode. If the routine branches to step 703, it is determined that whether or not the failure has been detected in the first mode as shown in FIG. 11 by evaluating a flag XIN. The flag XIN is also memorized in the back-up RAM. If the flag XIN is 1, in step 704, the ECU 29 executes a failed component determining processing as shown in FIGS. 12–14. Alternatively, the step 703 may be eliminated, and the ECU 29 executes step 704 in response to the command signal only. The processing in step 701 works as a mode changing means.

When the ECU 29 executes step 702, the ECU 29 simultaneously executes the throttle valve control. For example, the opening degree of the throttle vale 15 is controlled in accordance with an operating degree of an accelerator pedal and the engine speed NE. Therefore, the first mode of the diagnosis is executed under a normal and regular operating condition of the engine 11.

FIG. 11 shows a processing for the first mode for detecting a failure or abnormality of the intake system as a whole. In steps 801–803, the ECU 29 determines whether or not a first diagnosis conditions are established. In step 801, it is determined whether the engine speed NE is higher than a threshold kNE1. In step 802, it is determined whether the throttle opening degree TH is higher than a threshold kTH1. In step 803, it is determined whether the intake pressure PM is higher than a threshold kPM1. The first diagnosis conditions indicate an engine operating condition in which the intake air amount is expected to be increased within a range that is capable of maintaining the drive performance and emissions low.

If all the determinations are YES in steps 801–803, the routine proceeds to step 804. In step 804, the ECU 29 determines that whether or not the intake air amount AM is lower than a threshold kAM1. If the determination is YES in step 804, the routine process to step 805 and 812. In steps 805, 812, it is assumed that the intake system has a failure or abnormality, therefore, the ECU 29 set the flag XIN, and activates the indicator 30. If the determination is NO in step 804, the routine proceeds to step 806 and reset the flag XIN.

If any one of the determinations in steps 801–803 is NO, the routine proceeds to steps 807–809. In steps 807–809, the ECU 29 determines whether or not a second diagnosis conditions are established. In step 807, it is determined whether the engine speed NE is lower than a threshold kNE2. In step 808, it is determined whether the throttle opening degree TH is lower than a threshold kTH2. In step 809, it is determined whether the intake pressure PM is lower than a threshold kPM2. The second diagnosis conditions indicate an engine operating condition in which the intake air amount is expected to be decreased within a range that is capable of maintaining the drive performance and emissions low.

If all the determinations are YES in steps 807–809 the routine proceeds to step 810. In step 810, the ECU 29 determines that whether or not the intake air amount AM is not lower than a threshold kAM2. If the determination is YES in step 810, the routine process to step 805 and 812. If the determination is NO in step 810, the routine proceeds to step 811 and reset the flag XIN.

FIG. 12 shows processing of the second mode for determining and locating a failed component in the intake system. In the second mode, the ECU 29 suspends the normal throttle control and executes a sequential throttle control in which the opening degree of the throttle valve is changed in a step-by-step manner. During the sequential throttle control, the ECU 29 monitors the engine speed NE, the intake pressure PM, the intake air amount AM and an actual value of the throttle opening degree TH.

In step 901, it is determined that whether or not the second mode is completed on the basis of a flag XDLMEND. In case of the second mode has not yet completed, in steps 902, 903, it is determined that whether nor not conditions for the second mode is established. In step 902, it is determined that whether the water temperature TW is higher than a threshold, e.g., 80° C. In step 903, it is determined that whether or not a shift position of a transmission is a neutral position. The transmission may be an automatic transmission in a drive train of the vehicle.

If both the determinations in steps 902 and 903 are YES, the routine proceeds to step 904. In step 904, it is determined that whether or not an increased amount CTH of the throttle valve opening degree is lower than a threshold, e.g., 60 degrees. The increased amount CTH is increased in a step-by-step manner. The increased amount CTH is initially set 0.

If CTH<60 is established, the routine proceeds to steps 905–910 for executing the sequential throttle control and monitoring the sensor signals. In step 905, a target throttle opening degree THtg is determined by an expression THtg=THid+CTH, where THid is a throttle opening degree for an idling. In addition, the ECU 29 drives the throttle valve 15 to achieve the target throttle opening degree THtg. In step 906, 907, the ECU 29 waits for a predetermined time, e.g., 5 seconds by incrementing the timer Ctime. In step 908, the ECU 29 stores the sensor signals NE, PM, AM and TH as diagnosis data. In step 909, the ECU 29 resets the timer Ctime. In step 910, the ECU 29 increments the increased amount CTH by 5 degrees.

The ECU 29 repeats steps 901–910 for storing the diagnosis data until the increased amount CTH reaches to 60 degrees. Then, if the increased amount CTH reaches to 60 degrees, the routine branches to steps 911–913. In step 911, the ECU 29 resets the increased amount CTH. In step 912, the ECU 29 executes processing shown in FIGS. 13 and 14 for locating the failed component. In step 913, the ECU 29 sets the flag XDLMEND.

Referring to FIGS. 13 and 14, the ECU 29 evaluates an NE-PM characteristic, an NE-AM characteristic and an NE-TH characteristic in order to locate the failed component.

In step 1001, the ECU 29 computes a gradient K(NE-PM) of the NE-PM characteristic on the basis of the diagnosis data stored in step 908. A typical example of the NE-PM characteristic is shown in step 1001 in FIG. 13. In step 1002, the ECU 29 computes a gradient K(NE-AM) of the NE-AM characteristic on the basis of the diagnosis data stored in step 908. A typical example of the NE-AM characteristic is shown in step 1002 in FIG. 13. In step 1003, the ECU 29 computes a gradient K(NE-TH) of the NE-TH characteristic on the basis of the diagnosis data stored in step 908. A typical example of the NE-TH characteristic is shown in step 1003 in FIG. 13. Those gradients can be computed by referring two representative points on the characteristics. Alternatively, an average value of a plurality of sectional gradients may be used as the gradients in steps 1001–1003.

In step 1004, the ECU 29 sets standard gradients KK(NE-PM), KK(NE-AM) and KK(NE-TH) for evaluating the detected gradients K(NE-PM), K(NE-AM) and K(NE-TH). The standard gradients are previously determined and stored in the ECU 29. The standard gradients are determined by measuring the characteristics of a plurality of intake systems that work properly. The standard gradients may be average values or center values of a plurality of samples.

In steps 1005, 1007, 1009, the ECU 29 compares an absolute value of a difference between the detected gradient and the standard gradient with a threshold value. In step 1005, the ECU 29 determines whether or not an absolute value of a difference between the detected gradient K(NE-PM) and the standard gradient KK(NE-PM) is greater than a threshold value K1. In step 1007, the ECU 29 determines whether or not an absolute value of a difference between the detected gradient K(NE-AM) and the standard gradient KK(NE-AM) is greater than a threshold value K2. In step 1009, the ECU 29 determines whether or not an absolute value of a difference between the detected gradient K(NE-TH) and the standard gradient KK(NE-TH) is greater than a threshold value K3.

If the determination in step 1005 is YES, it is assumed that the intake pressure sensor 18 is failed. The ECU 29 stores an intake pressure sensor failure in step 1006.

If the determination in step 1007 is YES, it is assumed that the airflow meter 14 is failed. The ECU 29 stores an airflow meter failure in step 1008.

If the determination in step 1009 is YES, it is assumed that the throttle sensor 16 is failed. The ECU 29 stores a throttle sensor failure in step 1010.

If all of the determinations in steps 1005, 1007 and 1009 are NO, the ECU 29 determines that there is no failure in the intake system in step 1011.

As described above, the ECU 29 monitors the sensor signals during forcedly changing the opening degree of the throttle valve, and evaluates the sensor signals whether or not the sensor signals follow the change of the opening degree of the throttle valve in accordance with given characteristics respectively.

Then, the ECU 29 transmits data indicative of the failed component stored in steps 1006, 1008, 1010 and 1011 to the service tool to display the failed component to a mechanic.

The routine shown in FIG. 14 may be modified so that step 1007 is executed after step 1006. As a result, it is possible to determine the failure of both the intake pressure sensor 18 and the airflow meter 14. Similarly, step 1009 may be executed after step 1008 to determine the failure of both the airflow meter 14 and the throttle sensor 16 or all of the sensors 18, 14, 16. In addition, although all of the processing are executed in an on-board device in the second embodiment, a part of the processing in step 704 may be executed in an off-board device such as the service tool that is connected with the ECU 29 at the maintenance shop. For example, the processing shown in FIGS. 13 and 14 may be executed on the service tool.

According to the second embodiment, it is possible to detect a failure or abnormality of the intake system while operating the engine 11 under an operating condition that enables a preferable drive performance and emissions. It is possible to warn the driver that the intake system has a failure or abnormality. In addition, it is possible to determine and locate the failed or abnormal component in the intake system by switching the diagnosis function of the ECU 29 from the first mode to the second mode. In case of operating the engine 11 to determine the failed component, the engine 11 may be operated under an operating condition that may lower the drive performance or increase emissions. However, the second embodiment can limit the event of the diagnosis of determining the failed component. For example, the second mode is only permitted for a maintenance shop. Therefore, it is possible to keep the drive performance and emissions during normal driving of the vehicle. In addition, the second mode is only permitted when the failure or abnormality is detected in the first mode. Therefore, it is possible to limit entering the second mode.

In addition, in the second mode, since the ECU 29 locates the failed component, it is possible to eliminate diagnosis work for locating the failed component and shorten work time of a mechanic. Conventionally, the mechanic has to work on a trial and error method to locate the failed component by replacing a suspicious component with a component that works properly. However, according to the present invention, it is possible to locate the failed component easily on the maintenance shop.

The ECU 29 may execute both the diagnosis processing for the intake system and the exhaust system shown in the first and second embodiments.

Although the self-diagnosis processing are executed by the ECU 29 in the above embodiments, the diagnosis processing may be executed by another electric control unit such as a diagnosis ECU provided only for the diagnosis.

In addition, the present invention may be applied to another system on vehicles. For example, the present invention may be applied to an evaporated fuel gas treatment system for preventing emission of evaporated fuel gas from a fuel tank. In this case, the first mode may be executed during the engine is operated, or during the engine is stopped. In the first mode, a failure or abnormality of the system is detected while preventing emission of the evaporated fuel gas. However, in the second mode, a failed component may be determined by operating the system in a manner that the evaporated fuel gas may be emitted.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An apparatus for diagnosis of a vehicular system mounted on a vehicle, the apparatus comprising:

detecting means for detecting a failure or abnormality of a vehicular system including a plurality of components that may be failed;

determining means for determining a failed component from the plurality of components; and diagnosis mode control means for switching diagnosis mode between a first mode and a second mode, wherein in the first mode, the detecting means is activated under a control condition such that no effect is applied to exhaust emission of the vehicle, and in the second mode, the determining means is activated under another control condition, which is different from the control condition in the first mode, when the vehicle is being serviced.

2. The apparatus for diagnosis of the vehicular system according to claim 1, wherein the apparatus is mounted on the vehicle, and the diagnosis mode control means activates the determining means in response to a command signal entered.

3. The apparatus for diagnosis of the vehicular system according to claim 1, wherein the detecting means detects, during the first mode, the failure or abnormality of the vehicular system by operating the vehicle under a predetermined condition, and the determining means locates, during the second mode, the failed component by operating the vehicle under a condition in which a performance is lowered than that during activation of the detecting means.

4. The apparatus for diagnosis of the vehicular system according to claim 1, wherein the determining means diagnoses the components one by one, and diagnoses at least one component while operating the vehicle under a condition in-which an influence of the other components is eliminated or reduced.

5. The apparatus for diagnosis of the vehicular system according to claim 1, wherein the vehicular system is an exhaust system of an engine having a catalyst and a gas sensor, the detecting means detects, during the first mode a failure or abnormality of the exhaust system, and the determining means determines, during the second mode, whether the failed component is the catalyst or the failed component is the gas sensor.

6. The apparatus for diagnosis of the vehicular system according to claim 5, wherein the detecting means detects the failure or abnormality on the basis of a signal that is outputted from the gas sensor when the engine is operated under a condition in which the performance of the vehicle is not lowered by controlling an air-fuel ratio supplied to the engine so that a storage amount of rich components and lean components in the catalyst is maintained below a saturated storage amount.

7. The apparatus for diagnosis of the vehicular system according to claim 5, wherein the determining means determines the failed component on the basis of a signal that is outputted from the gas sensor when the engine is operated under a condition in which an influence of the catalyst is eliminated or reduced by controlling an air-fuel ratio supplied to the engine so that a storage amount of rich components and lean components in the catalyst is saturated.

8. The apparatus for diagnosis of the vehicular system according to claim 1, wherein the vehicular system is an intake system of an engine having an throttle sensor for detecting an opening degree of a throttle valve, an intake pressure sensor for detecting an intake pressure and an airflow meter for detecting an intake air amount, the detecting means detects, during the first mode, a failure or abnormality of the intake system, and the determining means determines, during the second mode, that whether the failed component is the throttle sensor, the failed component is the intake pressure sensor or the failed component is the airflow meter.

9. The apparatus according to claim 1, wherein the servicing of the vehicle for determination of the failed component, during the second mode is performed in a maintenance shop.

10. The apparatus according to claim 3, wherein the performance is one of the following vehicle performances: drive performance and exhaust gas performance.

11. The apparatus as in claim 1, wherein the determining means is activated in the second mode under the another control condition in which an operating condition of an engine of the vehicle executes fixed cyclic control between rich and lean control when the vehicle is being serviced.

12. An apparatus for diagnosis of a vehicular system mounted on a vehicle, the apparatus comprising:
    detecting means for detecting a failure or abnormality of a vehicular system including a plurality of components that may be failed;
    determining means for determining a failed component from the plurality of components; and
    diagnosis mode control means for usually activating the detecting means, and activating the determining means only when the vehicle is being serviced;
    wherein the vehicular system is an exhaust system of an engine having a catalyst and a gas sensor, the detecting means detects a failure or abnormality of the exhaust system, and the determining means determines whether the failed component is the catalyst or the failed component is the gas sensor;
    the determining means determines the failed component on the basis of a signal that is outputted from the gas sensor when the engine is operated under a condition in which an influence of the catalyst is eliminated or reduced by controlling an air-fuel ratio supplied to the engine so that a storage amount of rich components and lean components in the catalyst is saturated; and
    the determining means determines that whether or not the gas sensor is failed, then, the determining means determines that the catalyst is failed if it is determined that the gas sensor is not failed.

13. An apparatus for diagnosis of a vehicular system mounted on a vehicle, the apparatus comprising:
    detecting means for detecting a failure or abnormality of a vehicular system including a plurality of components that may be failed;
    determining means for determining a failed component from the plurality of components; and
    diagnosis mode control means for usually activating the detecting means, and activating the determining means only when the vehicle is being serviced;
    wherein the vehicular system is an exhaust system of an engine having a catalyst and a gas sensor, the detecting means detects a failure or abnormality of the exhaust system, and the determining means determines whether the failed component is the catalyst or the failed component is the gas sensor;
    the determining means determines the failed component on the basis of a signal that is outputted from the gas sensor when the engine is operated under a condition in which an influence of the catalyst is eliminated or reduced by controlling an air-fuel ratio supplied to the engine so that a storage amount of rich components and lean components in the catalyst is saturated; and
    the determining means sets an amount of fuel so that it is increased and decreased to control the air-fuel ratio larger than that when the detecting means is activated.

14. An apparatus for diagnosis of a vehicular system mounted on a vehicle, the apparatus comprising:
    detecting means for detecting a failure or abnormality of a vehicular system including a plurality of components that may be failed;
    determining means for determining a failed component from the plurality of components; and
    diagnosis mode control means for usually activating the detecting means, and activating the determining means only when the vehicle is being serviced;
    wherein the vehicular system is an intake system of an engine having an throttle sensor for detecting an opening degree of a throttle valve, an intake pressure sensor for detecting an intake pressure and an airflow meter for detecting an intake air amount, the detecting means detects a failure or abnormality of the intake system, and the determining means determines that whether the failed component is the throttle sensor, the failed component is the intake pressure sensor or the failed component is the airflow meter; and
    the detecting means detects the failure or abnormality of the intake system on the basis of a signal that is outputted from the airflow meter when both the opening degree of the throttle valve detected by the throttle sensor and the intake pressure detected by the intake pressure sensor are within ranges of operating conditions in which the performance of the vehicle is not lowered.

15. An apparatus for diagnosis of a vehicular system mounted on a vehicle, the apparatus comprising:
    detecting means for detecting a failure or abnormality of a vehicular system including a plurality of components that may be failed;
    determining means for determining a failed component from the plurality of components; and
    diagnosis mode control means for usually activating the detecting means, and activating the determining means only when the vehicle is being serviced;
    wherein the vehicular system is an intake system of an engine having an throttle sensor for detecting an opening degree of a throttle valve, an intake pressure sensor for detecting an intake pressure and an airflow meter for detecting an intake air amount, the detecting means detects a failure or abnormality of the intake system, and the determining means determines that whether the failed component is the throttle sensor, the failed component is the intake pressure sensor or the failed component is the airflow meter; and
    the determining means changes the opening degree of the throttle valve, and determines the failed component by determining whether or not signals from the throttle sensor, the intake pressure sensor and the airflow meter follow the change of the opening degree of the throttle valve.

16. A method for diagnosis of a vehicular system, the vehicular system including a plurality of components, the method comprising the steps of:
    detecting a failure or abnormality of the vehicular system by an apparatus mounted on a vehicle;
    after the detecting step detects the failure or abnormality, determining a failed component from the plurality of components in the failed or abnormal vehicular system when the vehicle is being serviced; and
    switching between a first mode of operation and a second mode of operation, wherein in the first mode, a detector for performing the detecting step is activated under a control condition such that no effect is applied to exhaust emission of the vehicle, and in the second mode, determining the failed component is activated under another control condition, which is different from the control condition in the first mode, when the vehicle is being serviced.

17. The method according to claim 16, wherein the servicing of the vehicle for determination of the failed component, during the second mode is performed in a maintenance shop.

18. The method according to claim 16, wherein determining, in the second mode, the failed component is activated in response to a command signal entered via a service tool which is off-board of the vehicle.

19. The method according to claim 16, wherein detecting, in the first mode, the failure or abnormality of the vehicular system is achieved by operating the vehicle under a predetermined condition, and determining, in the second mode, the failed component is achieved by operating the vehicle under a condition in which a performance is lower than that during the detection of the failure or abnormality.

20. The method according to claim 16, wherein determining, in the second mode, the failed component from the plurality of components includes diagnosing the components one by one, and diagnosing at least one component while operating the vehicle under a condition in which an influence of the other components is eliminated or reduced.

21. The method according to claim 16, wherein the vehicular system is an exhaust system of an engine having a catalyst and a gas sensor, detecting, in the first mode, the failure or abnormality comprises detecting the failure or abnormality of the exhaust system, and determining the failed component includes determining, in the second mode, whether the failed component is the catalyst or the failed component is the gas sensor.

22. The method according to claim 21 wherein detecting, in the first mode, the failure or abnormality is achieved on the basis of a signal that is outputted from the gas sensor when the engine is operated under a condition in which the performance of the vehicle is not lowered by controlling an air-fuel ratio supplied to the engine so that a storage amount of rich components and lean components in the catalyst is maintained below a saturated storage amount.

23. The method according to claim 16, wherein the vehicular system is an intake system of an engine having an throttle sensor for detecting, in the first mode, an opening degree of a throttle valve, an intake pressure sensor for detecting an intake pressure and an airflow meter for detecting an intake air amount, detecting the failure or abnormality includes detecting the failure of abnormality of the intake system, and determining, in the second mode, the failed component includes determining whether the failed component is the throttle sensor, the failed component is the intake pressure sensor or the failed component is the airflow meter.

24. The method as in claim 16, wherein determining the failed component is activated in the second mode under the another control condition in which an operating condition of an engine of the vehicle executes fixed cyclic control between rich and lean control when the vehicle is being serviced.

25. A method for diagnosis of a vehicular system, the vehicular system including a plurality of components, the method comprising the steps of:
  detecting a failure or abnormality of the vehicular system by an apparatus mounted on a vehicle; and
  after the detecting step detects the failure or abnormality, determining a failed component from the plurality of components in the failed or abnormal vehicular system when the vehicle is being serviced;
  wherein the vehicular system is an exhaust system of an engine having a catalyst and a gas sensor, detecting the failure or abnormality comprises detecting the failure or abnormality of the exhaust system, and determining the failed component includes determining whether the failed component is the catalyst or the failed component is the gas sensor; and
  determining the failure or abnormality includes determining the failed component on the basis of a signal that is outputted from the gas sensor when the engine is operated under a condition in which an influence of the catalyst is eliminated or reduced by controlling an air-fuel ratio supplied to the engine so that a storage amount of rich components and lean components in the catalyst is saturated.

26. The method according to claim 25, wherein determining the failed component includes determining whether or not the gas sensor is failed, then, determining that the catalyst is failed if it is determined that the gas sensor is not failed.

27. The method according to claim 25, wherein determining the failed component includes setting an amount of fuel to be increased and decreased to control the air-fuel ratio larger than that when the detecting of the failure of the abnormality is activated.

28. A method for diagnosis of a vehicular system, the vehicular system including a plurality of components, the method comprising the steps of:
  detecting a failure or abnormality of the vehicular system by an apparatus mounted on a vehicle; and
  after the detecting step detects the failure or abnormality, determining a failed component from the plurality of components in the failed or abnormal vehicular system when the vehicle is being serviced;
  wherein the vehicular system is an intake system of an engine having an throttle sensor for detecting an opening degree of a throttle valve, an intake pressure sensor for detecting an intake pressure and an airflow meter for detecting an intake air amount, detecting the failure or abnormality includes detecting the failure of abnormality of the intake system, and determining the failed component includes determining whether the failed component is the throttle sensor, the failed component is the intake pressure sensor or the failed component is the airflow meter; and
  detecting the failure or abnormality includes detecting the failure or abnormality of the intake system on the basis of a signal that is outputted from the airflow meter when both the opening degree of the throttle valve detected by the throttle sensor and the intake pressure detected by the intake pressure sensor are within ranges of operating conditions in which the performance of the vehicle is not lowered.

29. A method for diagnosis of a vehicular system, the vehicular system including a plurality of components, the method comprising the steps of:
  detecting a failure or abnormality of the vehicular system by an apparatus mounted on a vehicle; and
  after the detecting step detects the failure or abnormality, determining a failed component from the plurality of components in the failed or abnormal vehicular system when the vehicle is being serviced;
  wherein the vehicular system is an intake system of an engine having an throttle sensor for detecting an opening degree of a throttle valve, an intake pressure sensor for detecting an intake pressure and an airflow meter for detecting an intake air amount, detecting the failure or abnormality includes detecting the failure of abnormality of the intake system, and determining the failed component includes determining whether the failed component is the throttle sensor, the failed component is the intake pressure sensor or the failed component is the airflow meter; and determining the failed component includes changing the opening degree of the throttle valve, and determining the failed component includes determining whether or not signals from the throttle sensor, the intake pressure sensor and the airflow meter follow the change of the opening degree of the throttle valve.

* * * * *